United States Patent [19]
Ceney et al.

[11] Patent Number: 5,584,627
[45] Date of Patent: Dec. 17, 1996

[54] LOAD INDICATING FASTENERS

[75] Inventors: Stanley Ceney, 5 Griffiths Drive, Wombourne, Wolverhampton WV5 0JW, West Midlands; John A. B. Hirst, Kenilworth, both of England

[73] Assignee: Stanley Ceney, Wolverhampton, England

[21] Appl. No.: 318,697

[22] PCT Filed: Apr. 8, 1993

[86] PCT No.: PCT/GB93/00760

§ 371 Date: Jan. 9, 1995

§ 102(e) Date: Jan. 9, 1995

[87] PCT Pub. No.: WO93/21449

PCT Pub. Date: Oct. 28, 1993

[30] Foreign Application Priority Data

Apr. 10, 1992 [GB] United Kingdom ............... 9207880

[51] Int. Cl.$^6$ .................. F16B 31/02; G01L 5/00
[52] U.S. Cl. ................. 411/14; 411/916; 73/761; 116/DIG. 34
[58] Field of Search .......... 411/14, 916; 73/761; 116/212, DIG. 34

[56] References Cited

U.S. PATENT DOCUMENTS

| | | | |
|---|---|---|---|
| 2,995,033 | 8/1961 | Stifano, Jr. .................. | 411/14 |
| 3,060,731 | 10/1962 | Adise ........................ | 411/14 X |
| 5,102,273 | 4/1992 | Stanage ..................... | 411/14 |
| 5,222,849 | 6/1993 | Walton ...................... | 411/14 |

FOREIGN PATENT DOCUMENTS

| | | |
|---|---|---|
| 1477006 | 4/1967 | France . |
| 397701 | 8/1933 | United Kingdom . |
| 632601 | 11/1949 | United Kingdom . |
| 1150062 | 4/1969 | United Kingdom . |
| 1418508 | 12/1975 | United Kingdom . |
| 1511297 | 5/1978 | United Kingdom . |
| 2179459 | 3/1986 | United Kingdom . |
| 2212284 | 7/1989 | United Kingdom . |

*Primary Examiner*—Neill R. Wilson
*Attorney, Agent, or Firm*—Loeb & Loeb LLP

[57] ABSTRACT

A load indicating fastener composed of a body (2) having an abutment (9) which is moved by the changing length of the body (2) under an applied load, and a load sensing member (10) composed of an element (11) disposed in the direction in which a load is applied to the body (2) when the fastener is in the user characterized in that the element (11) is of elongated U-shape, a first limb (13) of the U providing an anchorage part (14) which is rigidly anchored to the body (2), the closed end of the U providing a bearing part (15) which bears on the abutment (9) so as to move with the abutment relative to the anchorage part (14) in response to a load applied to the body, and a second limb (16) of the U having an indicator (17) at its outer end which responds movement of the bearing part (15) and registers the applied load related to that movement on a scale (19).

20 Claims, 3 Drawing Sheets

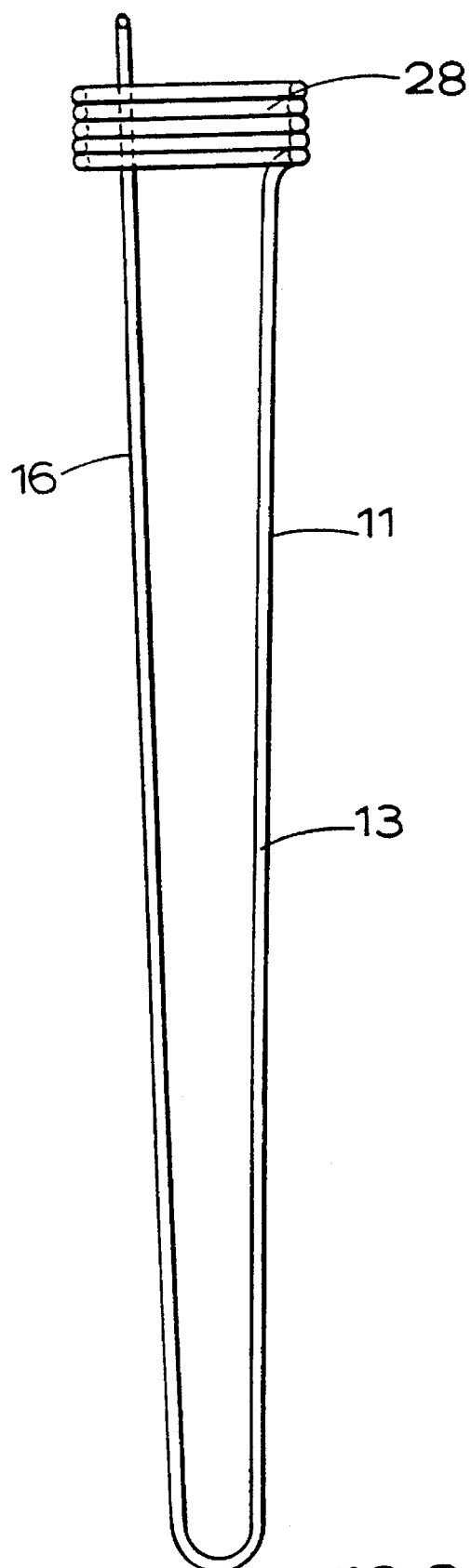
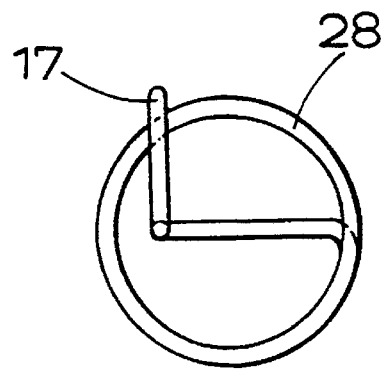
FIG.3.
FIG.4.

LOAD INDICATING FASTENERS

BACKGROUND OF THE INVENTION

This invention relates to a load indicating fastener which is adapted to indicate loads to which it is subjected in use.

It is desirable that applied fasteners should be properly tightened to designed load levels in order to ensure that secure joints are achieved by the use of the fasteners. Torque wrenches are commonly used for tightening fasteners such as bolts to pre-determined loads. They measure applied effort and are subject to friction so that the fastener loads they produce may not be as accurate as they might be. Fasteners have been proposed which indicate when desired loads have been applied to items but such fasteners have tended to be expensive and/or complicated to install.

One form of load indicating fastener is known from French Patent No. 1,477,006 in which a graduated wire or strip is fixed at one end in an internal bore of a stud. Elongation of the stud under tensile stress is measurable against the fixed scale of the strip to provide an indication of applied load. In this arrangement it is difficult to accurately read the small elongation against the scale.

Another form of fastener is disclosed in UK Patent Application GB 2,212,284 in which a stem fixed at one end to the shank of a bolt carries an electrical contact at its other end. Extension of the shank under an applied load draws the electrical contact towards an axially facing surface of the bolt. The variation in capacitance between the electrical contact and the surface may be used to provide an indication of the bolts extension and, hence, the applied load. Alternatively, completion of an electrical circuit between the electrical contact and the surface may indicate that a predetermined load has been applied. This system has been found to be complicated and expensive to implement with the required degree of accuracy. In addition, it does not provide a visual indication of applied load.

SUMMARY OF THE INVENTION

The present invention aims to provide a load indicating fastener which indicates applied loads effectively and may be manufactured at reasonable cost.

According to the present invention a load indicating fastener is provided which comprises a body having an abutment which is moved by the changing length of the body under an applied load, and load sensing means comprising an element disposed in the direction in which a load is applied to the body when the fastener is in use characterised in that the element is of elongated U-shape, a first limb of the U providing an anchorage part which is rigidly anchored to the body, the closed end of the U providing a bearing part which bears on the abutment so as to move with the abutment relative to the anchorage part in response to a load applied to the body, and a second limb of the U having an indicator at its outer end which responds to movement of the bearing part and registers the applied load related to that movement on a scale.

The fastener may be in the form of a bolt or a stud, but it may possibly take other forms. In the form of a bolt the body of the fastener comprises a head and shank which may be of substantially standard form. Similarly in the form of a stud the body comprises a shank which may be of substantially standard form. In either case the load sensing means responds to change in the length of the shank under applied loads. Conveniently the scale is at the bolt head or end of the stud shank where it can be seen readily when the fastener is in use.

The load sensing means responds to changes in the length of the body as the fastener is being secured and when the fastener has been secured for use. Thus as the fastener is being secured the applied loads will be registered on the scale which will indicate when a required working load has been applied. When the fastener has been secured any change in the load at which it was set for use will be indicated at the scale.

Actual load figures may be indicated on the scale; loads in terms of fractions or percentages of a maximum load that should be applied may be represented, or just one required applied load, or the scale may indicate loading in some other desired manner. What the scale indicates may be determined by the intended use of the fastener.

The load sensing means may be arranged to register applied loads up to the proof load for the material of the fastener, that is the maximum load that can be sustained before there is a permanent change from the original length of the body.

Preferably the element is made of the same material, or at least has the same coefficient of thermal expansion, as the material of the body so that the functioning of the load sensing means will not be affected by changing temperatures at which the fastener may be used. In a preferred embodiment, the element may be made of wire and the anchorage part is at the end of one limb remote from the bearing part of the element and the limb allows the bearing part to move relative to the anchorage part. Preferably the limbs can move resiliently relative to one another about the bearing part in response to movement of the bearing part with the abutment.

At least in part the load sensing means may be located in a blind bore or passage in the body. When the load sensing means comprises an element, as described above, the abutment on which the bearing part bears may be the blind end of the bore or passage, or it may be provided by an insert fitted into the blind end portion of the bore or passage. The anchorage part may be anchored in or adjacent a mouth of the bore or passage. The bore or passage may have an enlarged mouth portion in which the anchorage part is anchored. Conveniently the scale is located in or adjacent the mouth of such a bore or passage.

There may be direct anchorage of the anchorage part to the body, for example by welding or adhesive bonding, or the part may be anchored to a support which is suitably fixed to the body. The support may be in the form of a plug or other closure which closes the bore or passage in which the element extends. The scale may be on the support. In the preferred form of the element the limb having the indicator may pass through an opening in the support to the scale and be guided by the opening for movement of the indicator relative to the scale.

If desired the load sensing means may be adapted to give a signal, in addition to registering with the scale, that a given load or loads has or have been applied to the shank. For example, the load sensing means may be contained in an electrical circuit which is designed to produce an audible and/or visual signal when a given load is registered on the scale. The electrical circuit could be arranged to operate suitable means for setting or adjusting the load on the body of the fastener, if appropriate.

The load sensing means may be arranged to operate over a given range of changes of length of the body under applied loads. This will usually be the elongation of the body from the unloaded condition up to application of the relevant proof load. In the form in which the load sensing means comprises an element with a bearing part which bears on an abutment at the body, the element may be set to bear on the abutment when the body is unloaded with a pre-determined bearing force which reduces to zero when the relevant proof load is applied. For a given elongation under a proof load a required original, length of the element can be calculated from:

$$\text{original length} = \frac{E \times A \times \text{elongation}}{\text{Load}}$$

where

E=Youngs Modulus for the material of the body.

A=cross sectional area of the body.

For different cross sectional areas and/or proof loads the required original length will vary. For a range of fastener sizes and proof loads load sensing means with elements of different lengths may be provided, as required. However, it is generally easier and more economical for production to provide load sensing means for fasteners in accordance with the invention with elements of a standard length and to compensate for the difference between that length and the required length for any particular fastener by adjusting the position of the abutments at the bodies of the fasteners. Thus where the element extends in a blind bore of passage, as described, the abutment adjustments may be readily achieved by fitting an insert of the required length difference into the bore or passage for the bearing part of the element to bear upon.

It is possible for the load indicating fastener now provided to give a highly accurate indication of applied loads. The indication on the scale of an applied load enables a person to see readily what the applied loading is on the fastener when it is in use.

The fastener may be manufactured without being substantially more expensive than a conventional fastener of similar type. Furthermore, a conventional fastener may be readily adapted to include the load sensing means to be in accordance with the present invention.

BRIEF DESCRIPTION OF THE DRAWING

An embodiment of the present invention will now be described by way of example with reference to the accompanying drawings in which:

FIG. 3 is an elevational view of a modified element which may be included in the fastener, and FIG. 4 is a plan view of the modified element.

Figure 1:
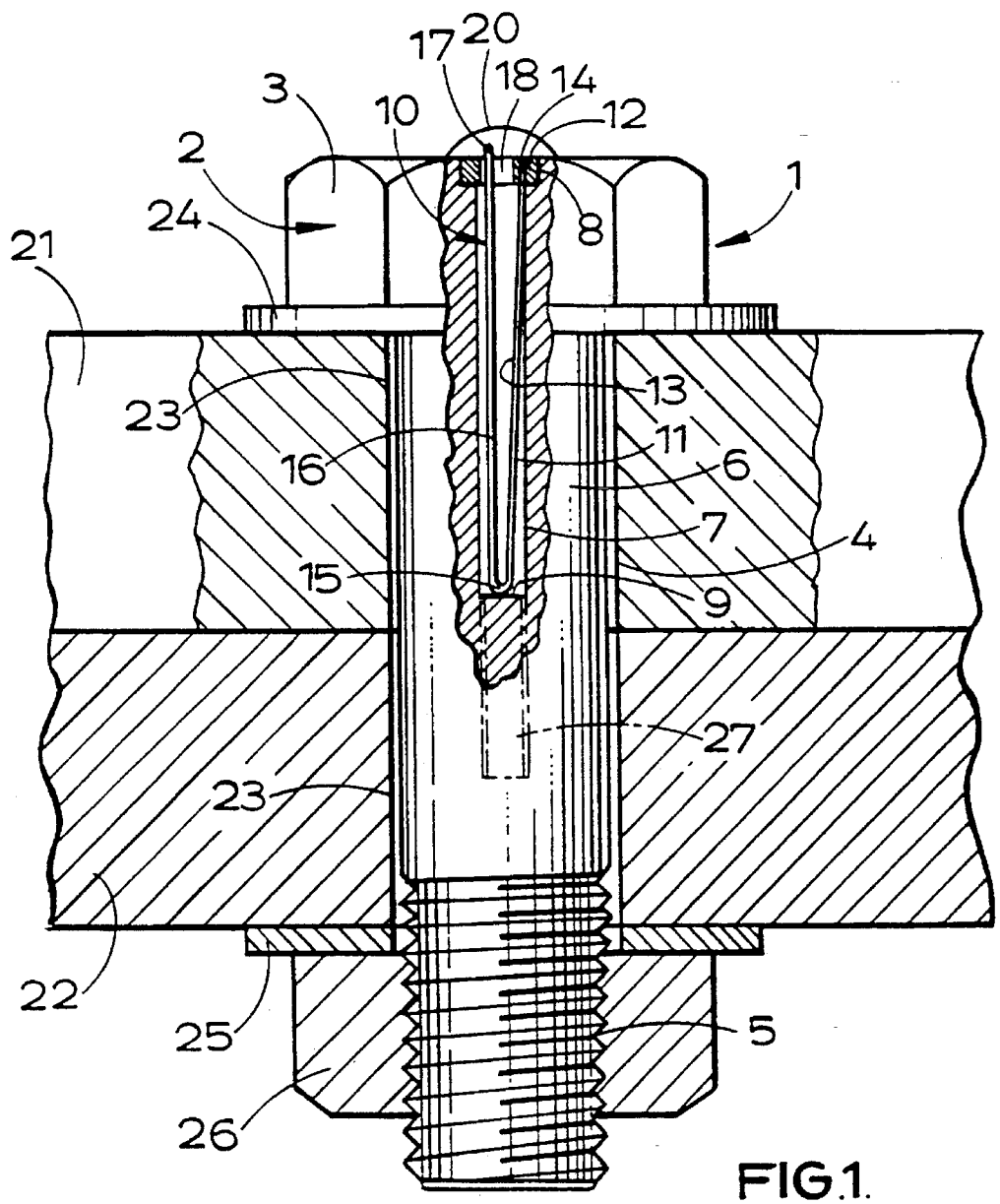
FIG. 1 is a partly sectioned side view of a load indicating fastener in accordance with the invention shown fitted for use.
Figure 2:
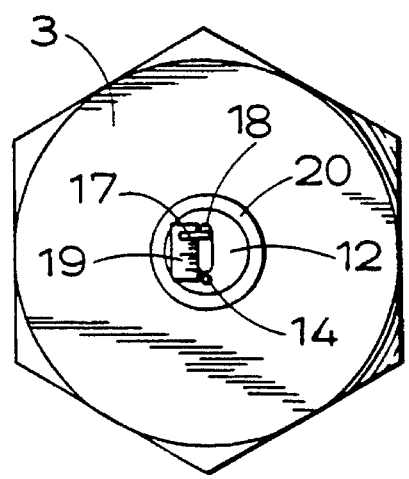
FIG. 2 is a plan view of the fastener.

In this embodiment a load indicating fastener is provided in the form of a bolt 1 have a metal, for example steel, body 2 comprising a hexagonal head 3 and a shank 4 which has an externally screw-threaded portion 5 spaced from the head 3 by a plain cylindrical portion 6.

Drilled into the body 2, co-axially with its rotational axis, is a blind bore 7 which extends from the top of the head 3, through the head and into the shank 4 for approximately half the length of the plain cylindrical portion 6. The outer end of the bore 7 is counterbored to form an enlarged mouth 8. The closed inner end of the bore 7 serves as an abutment 9.

Fixed in the bore 7 is a load sensing means 10 which comprises an element 11 made from wire of the same material as the body 2 bent to a narrow elongated U-shape and supported by a metal plug 12. The plug 12 is rigidly secured in the mouth 8 of the bore 7, for example by a suitable adhesive. A first limb 13 of the element 11, which in the free state is straight, has an anchorage part 14 at its outer end; the closed end of the U-shape of the element forms a bearing part 15 of the element, and the other, second, limb 16 of the element has its outer end bent over at right angles to the limb, in a direction at right angles away from the first limb 13 to form an indicator 17. The anchorage part 14 of the first limb 13 is anchored in the plug 12, being received into and bonded in a drilling of complementary diameter in the plug. The second limb 16 passes freely through a slot 18 in the plug extending towards the anchorage part 14 and the indicator 17 is exposed outside the plug, at the top of the head 3 of the body 3.

Fixed, or marked, on the plug 12 alongside the slot 18 is a scale 19 which the indicator overlies. The scale 19 is graduated to show loads applied to the shank 4 when the fastener is in use. A protective transparent cover 20, of a suitable plastics material or glass, is secured to the head 3, as by adhesive, over the scale 19 and indicator 17. If the fastener is to be used at high temperatures the cover 20 may be made of a temperature resistant glass.

As a modification the head 3 may have a second counterbore to receive the cover 20 so that the cover is contained within, or substantially within, the head.

The diameter of the bore 7 and the width of the element 11 across its limbs 13,15 are so related that the element extends with clearance along the bore. In the free, unloaded, condition of the element the indicator 16 is at the end of the slot 18 remote from the anchorage part 14 of the element.

The element responds to loads applied to the shank 4 of the body 2 when the fastener is in use. The response is related to the extension of the shank under applied loads. It is appropriate for the element to sense and indicate loads applied up to the proof load for the material of the body. Therefore the element is arranged to respond to extension of the shank up to the extension caused by the proof load. For this to be achieved the element is set in the bore 7 of the body such that the bearing part 15 bears on the abutment and the first limb 13 is under a compressive load which, in the unloaded condition of the fastener, causes that limb to bow between the plug and the abutment to an extent which deflects the bearing part towards the plug by a distance corresponding to the extension of the shank under the proof load. Typically for steel the extension is of the order of 0.2 mm. The necessary free length of the first limb 13 from the plug to the bearing part to provide that deflection is:

$$\begin{array}{c}\text{Length of bore from underside}\\\text{of plug (i.e. bottom of the}\\\text{counterbore forming mouth 8)}\\\text{to underside of head}\end{array} + \text{Gauge length}$$

$$\text{Where gauge length} = \frac{E \times A \times \text{elongation}}{\text{Load}}$$

E=Youngs Modulus for the body material

A=cross sectional area of the shank elongation=elongation under proof load,

Load=proof load for the body material

Typically the free length of the first limb 13 is 30–50 mm.

Under the deflection of the bearing part 15 and the bowing of the first limb 13 the second limb 16 of the element is resiliently deflected towards the first limb. As initially set in the unloaded fastener, therefore, the indicator 17 of the element 11 is at the end of the slot 18 nearest to the anchorage part 14 of the element.

As load is applied to the fastener in use and the shank extends under the load, the bearing force of the bearing part 15 on the abutment 9 gradually reduces so that the first limb 13 progressively returns towards its normal straight form and the second limb 16 moves away from the first limb, the indicate 17 moving along the slot 18 away from the anchorage part 14. When the proof load is reached and the bearing force of the bearing part in the abutment is zero the first limb has fully straightened, the second limb has moved its full extent away from the first limb and the indicator is at or near the opposite end of the slot 18 from the anchorage part.

The scale is graduated to show applied loading up to the proof load so that the indicator registers on the scale loads as they are applied to the fastener in use. Because of the linear relationship between extension and applied load up to the proof load graduating the scale between the extreme positions of the indicator is straightforward. It can readily be seen, therefore, when a required load has been applied as the fastener is being secured. The load can be subsequently checked by the indicator reading on the scale and any deviation from a required set load can be corrected.

In FIG. 1 of the accompanying drawings the fastener is shown in use securing two flat members 21,22 together face to face. The shank 4 passes through plain holes 23 in the flat members and is fitted with washers 24,25 respectively between its head 3 and the adjacent member 21 and between a nut 26 fitted to the screw-threaded portion 5 of the shank and the other member 22. As the nut 26 is tightened on the shank 4 the applied tensile load on the shank is registered by the indicator on the scale 19 at the head 3 of the fastener.

Instead of the abutment 9 formed by the closed end of the bore 7, an abutment for the bearing part 15 of the element may be provided by an outer end of an insert 27 located in the bore at its closed end, as indicated in FIG. 1. The insert 27 may conveniently be a metal slug of the same material as the body of the fastener. The slug may be cut from a bar or rod of complementary diameter to the bore 7. By the use of inserts the element may be made of a standard length which may be used for the fastener in a range of sizes and the difference in gauge lengths required for the different fastener sizes can be made up by inserts of the appropriate lengths.

A modified form of the element 11 is shown in FIGS. 3 and 4 of the drawings. In this case an outer end portion of the first limb 13 is helically wound into a closed coil anchorage part 28 through which the second limb 16 freely extends. The coiled anchorage part 28 avoids the need for the plug 12 of the embodiment described above and is fixed directly in the mouth 8 of the bore 7. For this element the scale 19 is provided on a disc, not shown, which is secured on the head of the fastener body or in the, or a further, counterbore of the bore at the mouth 8, the disc, like the plug, having a slot for the second limb 16 to pass through to the indicator 17.

If desired the element 11, in either of the two forms described, may be coated with a suitable electrical insulating material except at its anchorage part and indicator. One or more electrical contact points may be provided on the scale 19. The element and scale may then be incorporated into an electrical circuit to a visual or audible alarm device, the circuit, when energised, being arranged to be completed to operate the device when the indicator makes contact with the, or any, contact point on the scale so as to give a warning that a required load, or certain loads, has or have been applied to the fastener. This electrical circuit could be used to control a tool for tightening the fastener or to give a warning that loading on the secured fastener has varied from a required setting and needs to be corrected.

The provision of the load sensing means in the fastener described, including the forming of the bore 7, does not reduce the strength of the fastener because all that is required is contained within the uniform stress portion of the body—the head and unthreaded part of the shank, away from the screw-threaded portion.

Figure 5:
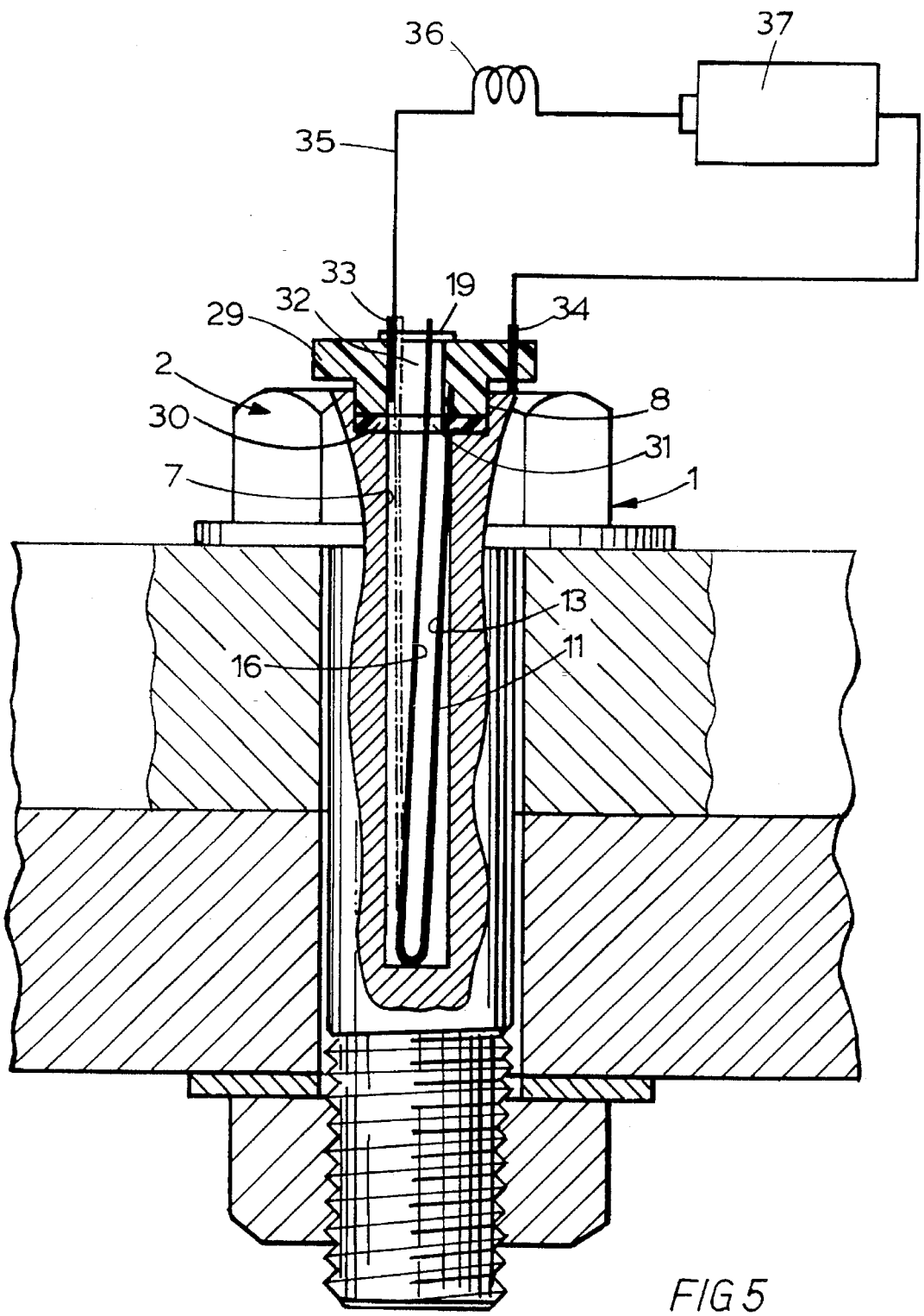
FIG. 5 is a partly sectioned side view, similar to FIG. 1, showing a load indicating fastener in accordance with the invention equipped with an electric circuit to provide a loading warning.

An example is shown in FIG. 5 of a modification of the bolt 1 to include an electric circuit which provides a loading warning. The bolt is modified by replacement of the plug 12 by an electrical connector 29 and washer 30, both of electrically insulating material, fixed in the enlarged mouth 8 of the bore 7 in the body 2 of the bolt. The first limb 13 of the element 11 is anchored at its outer end in the connector 29, and the outer end of the second limb 16 extends through a central opening 31 in the washer 30 into a slot 32 in the connector 29 alongside which is the scale 19. Located in one end of the slot 32, at the proof load end of the scale 19, is an electrical contact 33. A further electrical contact 34 carried by the connector 29, outside the slot, engages with the head 3 of the bolt. The two contacts 33, 34 are connected into an electric circuit 35 containing an indicator bulb 36 and powered by a battery 37, or possibly by mains supply. The bulb 36 may be replaced by an audible alarm device. The electric circuit 35 is completed through the body 2 when the second limb 16 engages with the contact 33 in the slot 32. While the fastener is unloaded the second limb 16 is spaced from the contact 33, at the opposite end of the slot. When load is applied on the fastener the second limb 16 moves along the slot toward the contact 33. When it engages with the contact 33, as indicated in phantom, the electric circuit 35 is completed and the bulb 36 is illuminated to give warning that the loading on the fastener has reached the proof lead.

The element, in either form described, the plug and scale, and disc, can be made quite cheaply and can be assembled as necessary and fitted to the body of the fastener without undue difficulty, so that the fastener can be produced at a cost which is not excessively expensive compared with a conventional fastener.

We claim:

1. A load indicating fastener comprising a body (2) having an abutment (9) which is moved by the changing length of the body (2) under an applied load, and load sensing means (10) comprising an element (11) disposed in the direction in which a load is applied to the body (2) when the fastener is in use characterised in that the element (11) is of elongated U-shape, a first limb (13) of the U providing an anchorage part (14) which is rigidly anchored to the body (2), the closed end of the U providing a bearing part (15) which bears on the abutment (9) so as to move with the abutment relative to the anchorage part (14) in response to a load applied to the body, and a second limb (16) of the U having an indicator (17) at its outer end which responds to movement of the bearing part (15) and registers the applied load related to that movement on a scale (19).

2. A load indicating fastener according to claim 1 characterised in that the element (11) is made of a material having the same coefficient of thermal expansion as the material of the body (2).

3. A load indicating fastener according to claim 2 characterised in that the element (11) is made of wire.

4. A load indicating fastener according to claim 2 characterised in that the limbs (13,16) of the element (11) are resiliently movable relative to one another about the bearing part (15) in response to movement of the bearing part with the abutment (9).

5. A load indicating fastener according to claim 2 characterised in that at least in part the load sensing means (10) is located in a blind bore or passage (7) in the body (2).

6. A load indicating fastener according to claim 5 characterised in that the abutment (9) is formed by the closed end of the bore or passage (7).

7. A load indicating fastener according to claim 5 characterised in that the abutment (9) is provided by an insert (27) in the closed end portion of the bore or passage (7).

8. A load indicating fastener according to claim 2 characterised in that the anchorage part (14) of the element is anchored to a support (12) fixed to the body (2) and closing the bore or passage (7).

9. A load indicating fastener according to claim 8 characterised in that the scale (19) is on the support (12).

10. A load indicating fastener according to claim 8 or claim 9 characterised in that the second limb (16) of the element (11) passes through an opening (18) in the support (12) to the scale (19).

11. A load indicating fastener according to claim 5 characterised in that the anchorage part (28) of the element (11) is anchored directly to the body (2).

12. A load indicating fastener according to claim 11 characterised in that the anchorage part (29) is in the form of a coil which is anchored in a mouth (8) of the bore or passage (7).

13. A load indicating fastener according to claim 2 characterised in that the load sensing means (10) is adapted to give a signal that a given load or loads has or have been applied to the body (2) when the fastener is in use.

14. A load indicating fastener according to claim 13 characterised in that the load sensing means (10) is contained in an electrical circuit designed to produce an audible and/or visual signal when a given load or loads is or are registered on the scale (19).

15. A load indicating fastener according to claim 13 characterised in that the load sensing means (10) is contained in an electrical circuit adapted to operate means for applying load on the body (2) in use of the fastener.

16. A load indicating fastener according to claim 1 characterised in that the element (11) is made of wire.

17. A load indicating fastener according to claim 1 characterised in that the limbs (13, 16) of the element (11) are resiliently movable relative to one another about the bearing part (15) in response to movement of the bearing part with the abutment (9).

18. A load indicating fastener according to claim 1 characterised in that at least in part the load sensing means (10) is located in a blind bore or passage (7) in the body (2).

19. A load indicating fastener according to claim 1 characterised in that the anchorage part (14) of the element is anchored to a support (12) fixed to the body (2) and closing the bore or passage (7).

20. A load indicating fastener according to claim 1 characterised in that the load sensing means (10) is adapted to give a signal that a given load or loads has or have been applied to the body (2) when the fastener is in use.

* * * * *